United States Patent [19]

De Piola

[11] Patent Number: 5,051,670
[45] Date of Patent: Sep. 24, 1991

[54] AIRCRAFT DC STARTER-GENERATOR TORQUE CONTROLLER

[75] Inventor: Frank J. De Piola, Glen Cove, N.Y.

[73] Assignee: Aircraft Parts Corp., Farmingdale, N.Y.

[21] Appl. No.: 559,908

[22] Filed: Jul. 30, 1990

[51] Int. Cl.⁵ .............................................. H02P 7/00
[52] U.S. Cl. ..................................... 318/434; 318/432
[58] Field of Search .............. 318/615, 616, 618, 599, 318/632, 257, 264, 749, 778, 779, 781, 782, 787, 798, 799, 807, 811, 432, 434; 322/826, 829, 831, 804; 361/23, 30

[56] References Cited

U.S. PATENT DOCUMENTS

| | | | |
|---|---|---|---|
| 3,749,991 | 7/1973 | Kuniyoshi | 318/254 |
| 3,845,372 | 10/1974 | Ringland et al. | 318/635 |
| 3,962,612 | 6/1976 | Kawasaki | 318/139 |
| 4,060,753 | 11/1977 | Okuyama et al. | 318/254 |
| 4,103,211 | 7/1978 | Gardner et al. | 318/87 |
| 4,217,529 | 8/1980 | Bourke et al. | 318/424 |
| 4,300,081 | 11/1981 | Van Landingham | 318/599 |

Primary Examiner—William M. Shoop, Jr.
Assistant Examiner—A. Jonathan Wysocki
Attorney, Agent, or Firm—Daniel Jay Tick

[57] ABSTRACT

A source of terminal voltage is connected to the armature current input terminal of a DC shunt motor whereby armature current is supplied to the armature. A monitor monitors the terminal voltage and armature current in a determined manner and varies the shunt field current in a manner whereby the air gap flux density of the motor is varied to control the torque of the motor drive shaft.

5 Claims, 3 Drawing Sheets

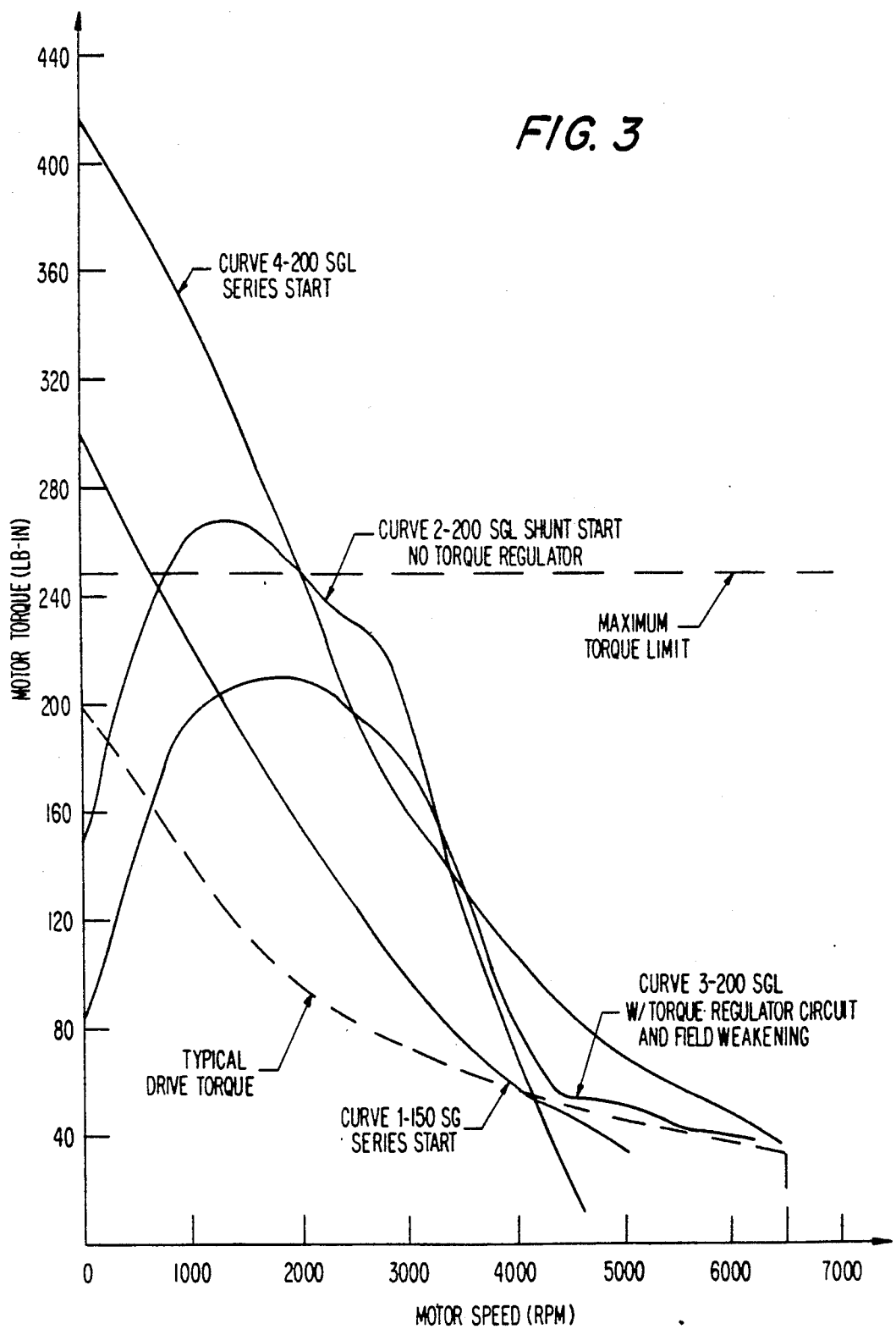

AIRCRAFT DC STARTER-GENERATOR TORQUE CONTROLLER

BACKGROUND OF THE INVENTION

The present invention relates to a DC motor torque controller. More particularly, the invention relates to a aircraft DC starter-generator torque controller in aircraft power transfer apparatus between auxiliary equipment such as, for example, aircraft starter-generator and a turbine engine through the gearbox of the turbine engine.

Heretofore, the starter-generator placed on board aircraft was sized to just meet the basic electrical needs of the aircraft with a safety factor. Size was kept to a minimum to keep the weight as low as possible to enable more lifting power to be utilized for fuel and load considerations which also affect range of flight. As more demands were put on the electrical power system with added gear, the onboard DC generator needed to be upgraded to handle the loads. Since the generator is also used for starting the engine, the resultant torque capability of the starter portion of the larger amperage starter-generator approached or exceeded the maximum rating of the gearbox and could not be safely operated during the start-up procedure. Thus, while the electrical loads could be safely operated during steady state conditions, the starter motor portion of the generator could not operate safely during the start-up procedure.

Changing the gearbox for the higher torque rating would be a severe setback, since it would require redesign of the engine gear box, which would result in added weight and prohibitive cost to retrofit existing aircraft or new aircraft using this same engine.

The principal object of the invention is to provide a aircraft DC starter-generator torque controller which reduces the very high initial starting torque of a DC shunt motor (starter-generator) used in the starting cycle of an aircraft turbine engine.

An object of the invention is to provide a DC motor torque controller which reduces the very high initial starting torque of a DC shunt motor used in the starting cycle of an aircraft turbine engine and maintains a controlled torque level during engine run-up to operating speed.

Another object of the invention is to provide a DC motor torque controller which reduces the very high initial starting torque of a DC shunt motor used in the starting cycle of an aircraft turbine engine, maintains a controlled torque level during engine run-up to operating speed, permits shorter time to engine lite off and lower engine temperature, permits setting of the rate of reduction of pulse width modulation (PWM) duty cycle and permits automatic switchover point for field control from terminal voltage control to armature current control for field weakening and increasing motor speed.

Still another object of the invention is to provide a aircraft DC starter-generator torque controller which permits higher rated startergenerators to permit increases in electric power available for use, which can satisfy extra load requirements and still remain within limitations imposed by the torque ratings of the power transfer gearbox.

Yet another object of the invention is to provide a aircraft DC starter-generator torque controller which controls or regulates the developed torque of a DC shunt motor, which may permit higher rated parts to be used on existing or future-designed equipment, one application of such controller being for an engine starter motor generator wherein the motor-generator is used for engine starting, after which the engine is utilized to drive the motor-generator to generate DC power.

Another object of the invention is to provide a aircraft DC starter-generator torque controller which lowers the maximum developed peak torque of a DC shunt motor during initial start-up from zero speed.

Still another object of the invention is to provide a aircraft DC starter-generator torque controller which maintains the developed torque of a DC shunt motor at a controlled higher level for a longer period of time during engine run-up to operating speed, thereby insuring the functioning of utilization equipment as intended.

Yet another object of the invention is to provide a aircraft DC starter-generator torque controller which permits higher rated DC shunt startergenerators to be used in applications where maximum torque excursions are limited by power transfer equipment.

Another object of the invention is to provide a aircraft DC starter-generator torque controller which permits the selection of the motor terminal voltage at which the torque control and/or regulating operation is initiated.

Still another object of the invention is to provide a aircraft DC starter-generator torque controller which permits a determination of the rate of reduction of torque control with terminal voltage.

Yet another object of the invention is to provide a aircraft DC starter-generator torque controller which permits a determination of the automatic switchover point for field control from terminal voltage control to armature current closed loop field weakening control.

Yet another object of the invention is to provide a DC generator torque controller which permits higher rated motor-generators to permit increases in electric power available for use, which can satisfy extra load requirements and still remain within limitations imposed by the torque ratings of the power transfer gearbox.

BRIEF SUMMARY OF THE INVENTION

In accordance with the invention, torque controlling apparatus for a DC shunt motor having an armature with a plurality of poles, a motor drive shaft coupled to and rotating with the armature, a compensating winding connecting the armature to ground, a field winding input terminal, a shunt field winding connecting the field winding input terminal in common to the compensating winding and to ground, an armature current input terminal connected to the positive pole of the armature, anarmature current measuring output terminal connected to common to the other pole of the armature and to the compensating winding, and an air gap flux density, comprises a source of terminal voltage connected to the armature current input terminal of the motor whereby armature current is supplied to the armature.

Monitoring means monitors the terminal voltage and the armature current in a determined manner and varies the shunt field current in a manner whereby the air gap flux density of the motor is varied to control the torque of the motor drive shaft.

The monitoring means comprises field control function generator means for controlling the developed torque on the motor drive shaft by varying the field current in a predetermined manner as the terminal voltage increases and decreases, from the current measuring output of the motor, the source of terminal voltage, a preset voltage level signal, a preset sensitivity signal and a preset armature current signal.

The field control function generator means has an output and the monitoring means further comprises pulse width modulator field control means for providing the field current for said motor with the field current as the controlled variable. The field control means has an input connected to the output of the field control function generator means and an input connected to the source of terminal voltage.

In accordance with the invention, torque controlling apparatus for a DC shunt motor having an armature with a plurality of poles, a motor drive shaft coupled to the armature, a compensating winding connecting the armature to ground, a shunt field winding input terminal, a shunt field winding, a winding connection connecting the end of the field winding in common to the compensating winding and to ground, an armature current input terminal connected to the positive pole of the armature, an armature current measuring output terminal connected to common to the other pole of the armature and to the compensating winding, comprises a source of terminal voltage connected to the armature current input terminal of the motor whereby armature current is supplied to the armature. A field control function generator controls the developed torque on the motor drive shaft by varying the field current in a predetermined manner as the terminal voltage increases and decreases. The function generator has a motor terminal voltage input which is connected to the armature current input terminal, an armature current feedback signal input, a voltage level input supplying a preset voltage level signal, a sensitivity input supplying a preset sensitivity signal, an armature current input supplying a preset armature current signal and an output. A pulse width modulator field control has an input connected to the terminal voltage and an output connected to the field winding input terminal of the motor and supplying field current to the field winding input terminal, the pulse width modulator field control providing the field current for the motor as an output.

BRIEF DESCRIPTION OF THE DRAWINGS

In order that the invention may be readily carried into effect, it will now be described with reference to the accompanying drawings, wherein:

FIG. 3 is a graphical presentation of the characteristics of the torque developed in a torque controller with and without the invention as connected in a typical application and torque limits superposed on the plots.

DETAILED DESCRIPTION OF PREFERRED EMBODIMENT

Figure 1:
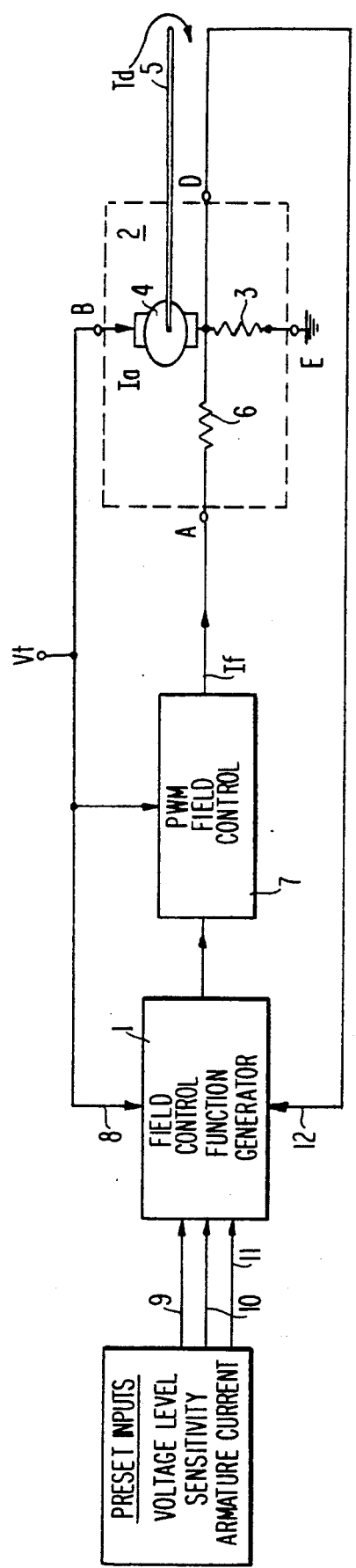
FIG. 1 is a block diagram of an embodiment of the DC motor torque controller of the invention.

The developed torque Td for a DC shunt motor is proportional to the air gap flux density Ba, the armature current Ia, the length of armature conductors 1 and the armature radius $$Td = k1(Ba)(l)(Ia)(r) \qquad (1)$$

For a specific motor-generator configuration where 1 and r are fixed, the variables affecting developed torque are the air gap flux density Ba and the armature current Ia.

The principle of the controller is to monitor the motor-applied terminal voltage, armature current and shaft speed as required, then vary the shut field current in a manner to vary the air gap flux density Ba to control the motor developed torque Td.

The air gap flux density Ba is theoretically proportional to the shunt field current If and determined by the motor magnetic circuit parameters.

$$Ba = K2(If) \qquad (2)$$

The developed torque is determined by the relationship (substituting If for Ba and assuming a fixed armature radius and conductor length)

$$Td = k(Ia)If \qquad (3)$$

where the field current If is the controlled input and the armature current Ia is determined by $$Ia = \frac{Vt - E}{Ra} \qquad (4)$$

where Vt is the motor terminal voltage, Ra is the armature circuit resistance (armature + compensating windings) and E is the armature back EMF.

If Equations 3 and 4 are combined, the equations for the developed torque is $$Td = \frac{k(If)(Vt - E)}{Ra} \qquad (5)$$

The back EMF E is proportional to the product of the air gap flux density Ba and the armature speed N $$E = N(Ba) \qquad (6)$$

At very low speeds, the back EMF is small compared to Vt and the equation for Td can be approximately by $$Td = \frac{k(If)Vt}{Ra} \qquad (7)$$

Equation 7 shows that, as the terminal voltage Vt increases or decreases, the developed torque Td may be controlled by varying the field current If in a predetermined manner. This is the purpose of the field control function generator 1 (FIG. 1).

A DC shunt motor 2 under control has four terminals A,B,E and D, as shown in FIG. 1. The motor 2 has a plurality of poles, preferably four, but may have more than four. These consist of an equal number of positive and negative poles. The terminal A is the field winding input, the terminal B is the armature current input, the terminal E is the ground return and the terminal D is the armature current measuring output at the compensating winding 3. The motor 2 has an armature 4, a drive shaft 5 having the developed torque Td and a shunt field winding 6 (FIG. 1). A pulse width modulator (PWM) field control 7 comprises a power switching transistor/driver. The field control function generator 1 provides the pulse width modulated control signal to the PWM field control 7. The field control function generator 1 has a motor terminal voltage input 8, three adjustable preset signals, a voltage level input 9, a sensitivity input 10 and an armature current input 11, and a feedback signal input 12, as shown in FIG. 1. The preset adjustable signal controls are determined by the motor 2 characteristics and the required torque characteristics.

At low speeds, the torque regulator monitors the terminal voltage Vt and adjusts the field current If inversely to the terminal voltage. This function is accomplished with the APC-developed torque controller of the invention. As the speed and back-EMF increase, the armature current Ia decreases per Equation 3. At a preset level of armature current, the field control is automatically switched from open loop terminal voltage control to closed loop constant armature current control for field weakening speed control. These two systems act to control the motor torque developed from zero speed to higher speeds. When the motor 2 reaches cut-off speed, the start cycle is terminated automatically, using the speed sensing signal and detecting circuit.

Figure 2:
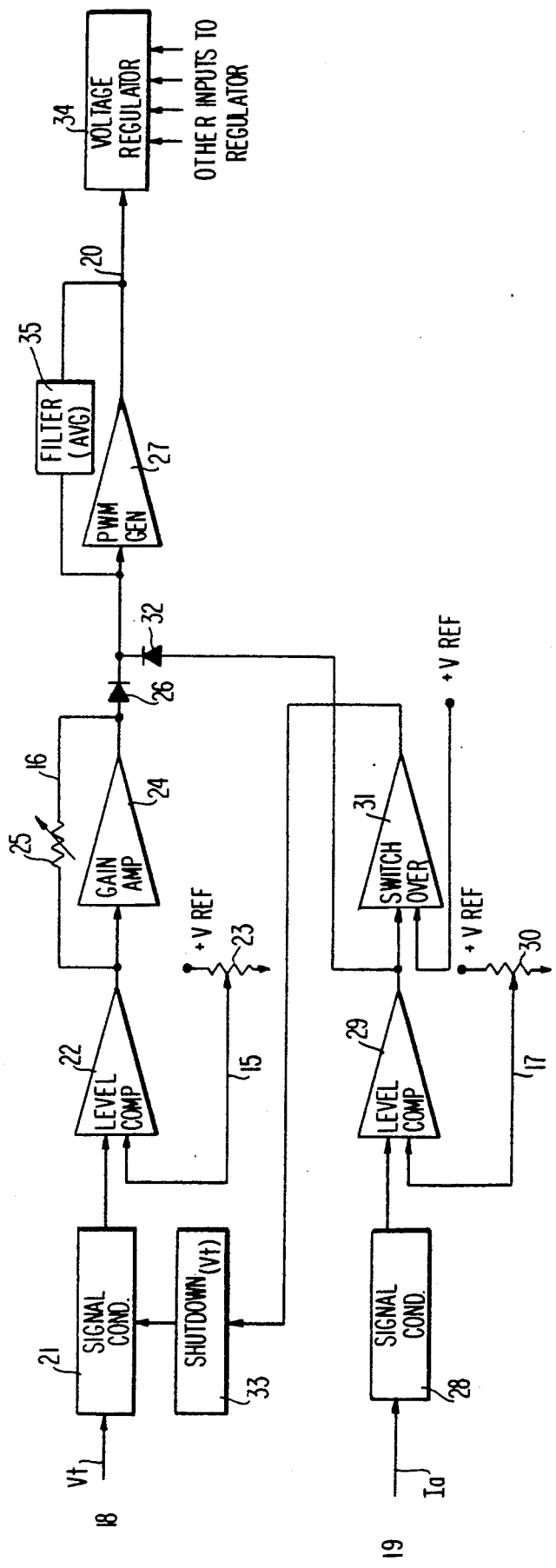
FIG. 2 is a functional block diagram illustrating the inputs, signal flow and adjustable setting locations of the pulse width modulator control of the DC motor torque controller of FIG. 1.

In FIG. 2, which is a more detailed functional diagram of the control system comprising the pulse width modulator control 7 of FIG. 1, input designator 15 functions as the terminal voltage level control, input designator 16 25 functions as the sensitivity control, input designator 17 functions as the armature current level control, input designator is functions as the terminal voltage input, input designator 19 functions as the armature current sensing input and output designator 20 functions as the pulse width modulation output.

As shown in FIG. 2, the terminal voltage of the power source is sensed at the input designator 18 and is conditioned for circuit use by a signal conditioner 21 which can consist of components such as resistors, capacitors and/or other components in series or shunt, interconnected to produce a signal level suitable for a level comparator 22. The signal conditioner 21 may comprise, for example, an operational amplifier of any suitable known type having a required gain. The operational amplifier may be manufactured by National Semiconductor Corporation, 2900 Semiconductor Drive, Santa Clara, Calif. 95052-8090. A suitable operational amplifier is described in the National Semiconductor Corporation "Linear Databook", 1988 Edition. The level comparator 22 may comprise, for example, a comparator modulator manufactured by the National Semiconductor Corporation. The operating point for the level comparator 22 is set by a variable resistor 23. This setting determines the motor terminal voltage at which the field PWM changes from 100% duty cycle, or full "on" for maximum field current, to a reduced duty cycle of less than 100% for reduced field current and reduced torque.

The output of the level comparator 22 is fed to a gain amplifier 24, which may comprise, for example, National Semiconductor Corporation LM158 low power dual operational amplifiers. The variable resistor 25 provides an adjustable setting which determines the rate of reduction of PWM duty cycle with increasing terminal voltage for field current (and torque) reduction control. The output of the gain amplifier 24 is passed through a diode 26, which is an isolation diode, to block a reverse signal from another level comparator 29 and feeds a PWM generator 27, which may comprise, for example, a regulating PWM manufactured by Silicon General, 11651 Monarch Street, Garden Grove, Calif. 92641 and known as SG15424B and described in the 1984-1985 Edition of the Silicon General databook. The diode 26 prevents signals from the armature sensing circuit from affecting operation of the gain amplifier 24.

The armature current is sensed by the input designator 19 and is conditioned for circuit use by another signal conditioner 28, which may be the same as the signal conditioner 21. The output of the signal conditioner 28 is fed to the other level comparator 29 for the armature current, which may be the same as the level comparator 22. The operating level of the comparator 29 is set by a variable resistor 30. The setting of one variable resistor 30 determines the automatic switchover point for field control from terminal voltage control to armature current closed loop field weakening control.

The output of the level comparator 29 is split into two branches, one of which feeds a switchover amplifier 31 and the other of which goes to a diode 32 for ORing with the diode 26 into the PWM generator 27. The switchover amplifier 31 may comprise, for example, a National Semiconductor LM158 operational amplifier connected as a comparator switch. The output of the switchover amplifier 31 provides an enable signal for a shutdown 33, which may comprise, for example, a transistor switch activated by the voltage source and functions as the shutdown switch for the signal conditioner 21. Whenever the shutdown 33 is enabled, it disables the signal conditioner 21 and control of the torque regulator is switched to the armature current circuit from the terminal voltage circuit.

The signal to the input of the PWM generator 27 from the ORed diodes is an analog level signal and said PWM generator transforms the analog signal to a series of digital pulses whose widths or "on" time durations are variable from full "on" to very narrow pulses, minimum "on". The pulses are variable in response to a specific level of voltage at the input to the PWM generator 27.

The output of the PWM generator 27 feeds into a voltage regulator module 34 at such a point that it can override the main regulation function and control the developed torque of the motor. The voltage regulator 34 may comprise, for example, a known voltage regulator. The filter 35 connected across the PWM generator 27 average the pulses from the output and feeds the average back to the input in closed loop operation, thus maintaining a fixed pulse time for a given level of input to said PWM generator. The filter 35 may comprise, for example, an RC filter which converts the PWM to average DC. The PWM generator 27 is preferably an integrated circuit block which provides the operational PWM functions. The PWM generator 27 is used as a local closed loop mode controller when the input is supplied from Vt input 18 through the diode 26 and as a local open loop controller when the input is supplied from Ia input 19 and diode 32. The system is under control from Vt input 18 as long as the input from Ia input 19 is greater than the output designator 17 reference set by the variable resistor 30. When Ia input 19 is slightly less than the reference set at the output designator 17, the input from Vt input 18 is disabled and the PWM control is switched over to operate as a closed loop controller with the motor field current as an output and armature current as the controlled variable.

FIG. 3 illustrates the performance characteristics of the torque controller. In FIG. 3 the abscissa depicts the motor speed in RPM and the ordinate depicts the motor torque in pound-inches. The torque controller of the invention with field weakening will limit the maximum torque developed by the motor as it accelerates in speed from zero speed and will maintain a higher torque for a longer time period during run-up to operating speed in a shunt motor than either a series motor of the same or 25% less power rating, or a shunt motor of the same power rating without said torque controller. FIG. 3 is an actual plot of the performance of the above-mentioned operation vs. the typical and maximum limit of torque for a specific application. Other specifications can be tailored in a similar manner with differently rated motor-generators or motors alone. The maximum torque limit is safety-related and the typical torque curve is the torque necessary for engine light-off, or equipment performance. Thus, in FIG. 3, the broken line curve represents a typical drive torque, the broken horizontal line represents the maximum torque limit, the curve 1 shows the torque of the motor with a 150 SG series start generator, the curve 2 shows the torque of the motor with a 200 SGL shunt start generator and no torque controller, the curve 3 shows the torque of the motor with a 200 SGL generator and with the torque controller and field weakening and the curve 4 shows the torque of the motor with a 200 SGL series start.

The terminal voltage was 28V DC and the starter generator types tested were APC 150 SG and APC 200 SGL.

The motor controller of the invention may be fabricated by using discrete components, functional, integrated circuits and discrete components as a hybrid circuit, and also by LSI (Large Scale Integration) as a monolithic block.

Although shown and described in what is believed to be the most practical and preferred embodiment, it is apparent that departures from the specific apparatus described and shown will suggest themselves to those skilled in that art and may be made without departing from the spirit and scope of the invention. I, therefore, do not wish to restrict myself to the particular construction described and illustrated, but desire to avail myself of all modifications that may fall within the scope of the appended claims.

I claim:

1. Torque controlling apparatus for a DC shunt motor having an armature with a plurality of poles including a positive and negative pole, a motor drive shaft coupled to and rotating with said armature, a compensating winding connecting with armature to ground, a field winding input terminal, a shunt field winding connecting said field winding input terminal to common to said compensating winding and to ground, an armature current input terminal connected to the positive pole of said armature, an armature current measuring output terminal connected in common to an other pole of said armature and to said compensating winding, and an air gap flux density, said torque controlling apparatus comprising a source of terminal voltage connected to said armature current input terminal of said motor whereby armature current is supplied to said armature; and monitoring means for monitoring said terminal voltage and said armature current in a determined manner and for varying the shunt field current in a manner whereby the air gap flux density of said motor is varied to control the torque of said motor drive shaft, said monitoring means comprising field control function generator means for controlling the developed torque on said motor drive shaft by varying the field current in a predetermined manner as the terminal voltage increases and decreases, said function generator means having a motor terminal voltage input connected to said armature current input terminal, a feedback signal input, a voltage level input supplying a preset voltage level signal, a sensitivity input supplying a preset sensitivity signal and an armature current input supplying a preset armature current signal and an output.

2. Torque controlling apparatus as claimed in claim 1, wherein said field control function generator means has an output and said monitoring means further comprises pulse width modulator field control means for providing said field current for said motor with said field current as the controlled variable, said field control means having an input connected to the output of said field control function generator means and an input connected to said source of terminal voltage.

3. Torque controlling apparatus as claimed in claim 1, wherein said field control function generator means includes terminal voltage level amplitude elements for initiating torque reduction and armature current level amplitude elements for initiating switchover from terminal voltage control to closed loop armature field weakening control.

4. Torque controlling apparatus for a DC shunt motor having an armature with a plurality of poles including a positive and negative poles, a motor drive shaft coupled to said armature, a compensating winding connecting said armature to ground, a shunt field winding input terminal, a shunt field winding, a winding connecting the end of said field winding in common to said compensating winding and to ground, an armature current input terminal connected to the positive pole of said armature, an armature current measuring output terminal connected in common to an other pole of said armature and to said compensating winding, said torque controlling apparatus comprising a source of terminal voltage connected to said armature current input terminal of said motor whereby armature current is supplied to said armature;

field control function generator means for controlling the developed torque on said motor drive shaft by varying the field current in a predetermined manner as the terminal voltage increases and decreases, said function generator means having a motor terminal voltage input connected to said armature current input terminal, a feedback signal input, a voltage level input supplying a preset voltage level signal, a sensitivity input supplying a preset sensitivity signal, and an armature current input supplying a preset armature current signal and an output; and pulse width modulator field control means having an input connected to the output of said function generator means, an input connected to said terminal voltage and an output connected to said field winding input terminal of said motor and supplying field current to said field winding input terminal, said pulse width modulator field control means providing said field current for said motor as an output.

5. Torque controlling apparatus as claimed in claim 4, wherein said field control function generator means includes terminal voltage level amplitude elements for initiating torque reduction and armature current level amplitude elements for initiating switchover from terminal voltage control to closed loop armature field weakening control.

* * * * *